(12) United States Patent
Megawa et al.

(10) Patent No.: US 7,127,103 B2
(45) Date of Patent: Oct. 24, 2006

(54) IMAGE PROCESSING APPARATUS AND IMAGE FORMING APPARATUS AND IMAGE PROCESSING METHOD AND IMAGE FORMING METHOD

(75) Inventors: Shunichi Megawa, Mishima (JP); Sunao Tabata, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 724 days.

(21) Appl. No.: 10/294,624

(22) Filed: Nov. 15, 2002

(65) Prior Publication Data

US 2004/0095590 A1    May 20, 2004

(51) Int. Cl.
*G06K 9/00*    (2006.01)
(52) U.S. Cl. .................. 382/162; 382/167; 358/1.9
(58) Field of Classification Search ................ 382/162, 382/166, 167; 358/1.9, 3.03
See application file for complete search history.

(56) References Cited

U.S. PATENT DOCUMENTS

| | | | | |
|---|---|---|---|---|
| 5,113,249 A | * | 5/1992 | Yosefi | 358/1.9 |
| 5,386,483 A | * | 1/1995 | Shibazaki | 382/162 |
| 6,345,117 B1 | * | 2/2002 | Klassen | 382/167 |
| 6,559,976 B1 | * | 5/2003 | Hirota | 358/3.03 |
| 6,795,214 B1 | * | 9/2004 | Weinholz et al. | 358/1.9 |
| 6,992,798 B1 | * | 1/2006 | Geurts et al. | 358/3.15 |
| 7,046,397 B1 | * | 5/2006 | Loce et al. | 358/1.9 |
| 2002/0037100 A1 | * | 3/2002 | Toda et al. | 382/166 |

FOREIGN PATENT DOCUMENTS

| EP | 0 998 131 A2 | 5/2000 |
|---|---|---|
| JP | 2000-196906 A | 7/2000 |

\* cited by examiner

*Primary Examiner*—Jingge Wu
*Assistant Examiner*—Yubin Hung
(74) *Attorney, Agent, or Firm*—Foley & Lardner LLP

(57) ABSTRACT

A trapping means judges that the gradated region is dark if compared with the uniform region and expands the uniform region to cause colors to overlap when the density average value Da of the gradated region is greater than the density value Du of the uniform region but judges that the gradated region is light if compared with the uniform region and expands the gradated region when the density average value Da of the gradated region is smaller than the density value Du of the uniform region.

17 Claims, 14 Drawing Sheets

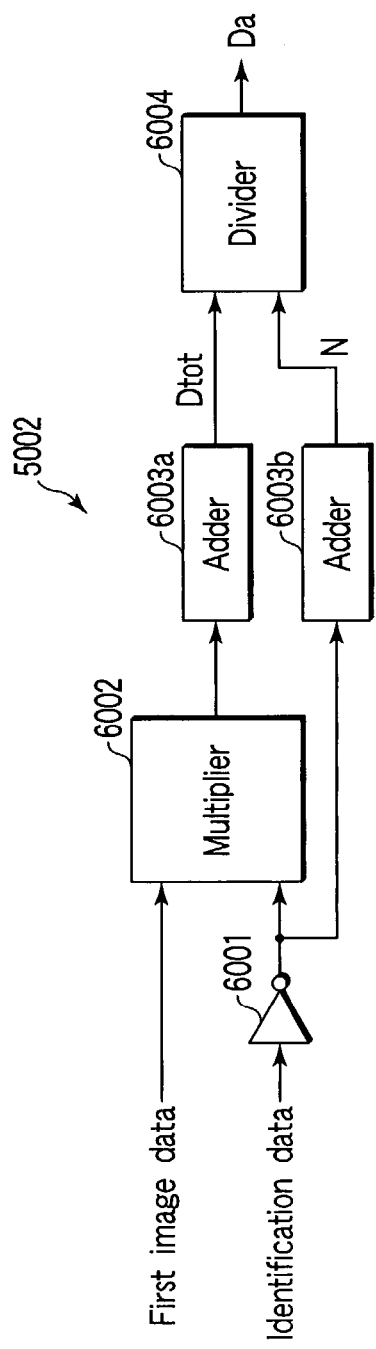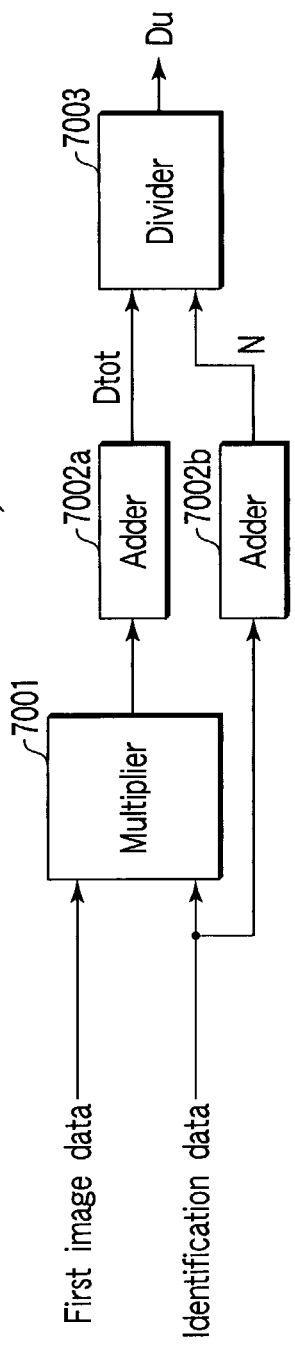
FIG. 3
FIG. 4

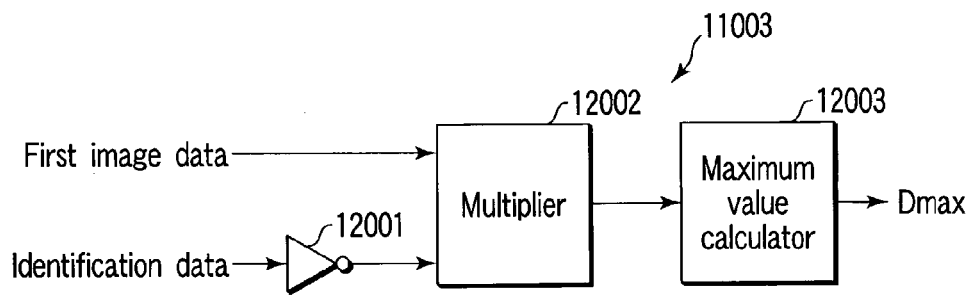
FIG. 12
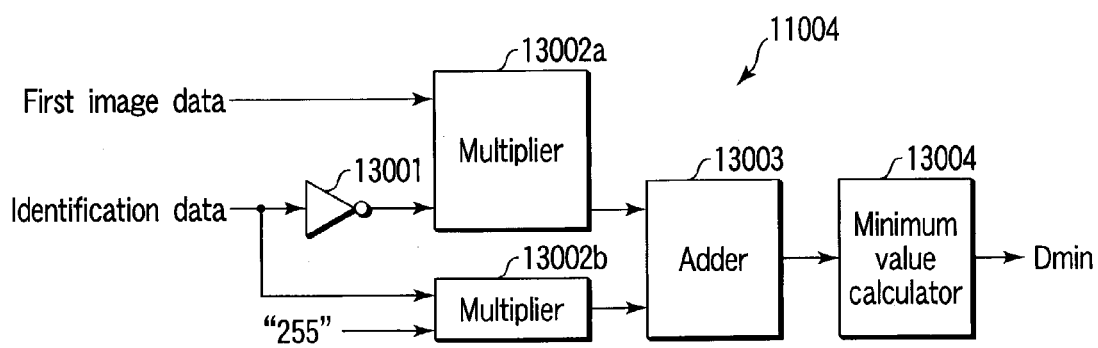
FIG. 13
| Condition | Gradated region | Uniform region |
|---|---|---|
| Dmin>Du | Dg+Du | Du |
| Dmax<Du | Dg | Da+Du |
| When neither of the requirements is met | Dg | Du |
FIG. 15

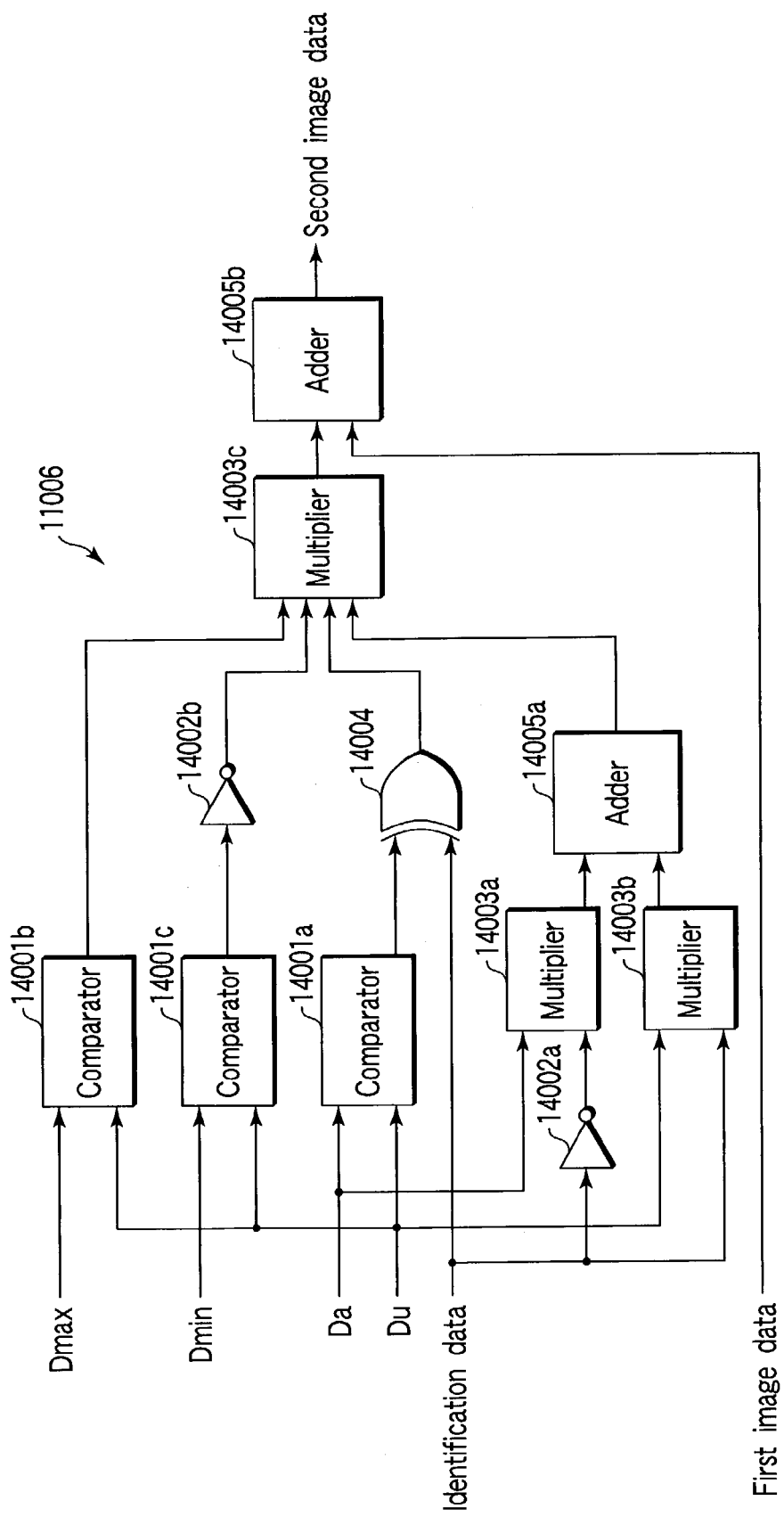
F I G. 14

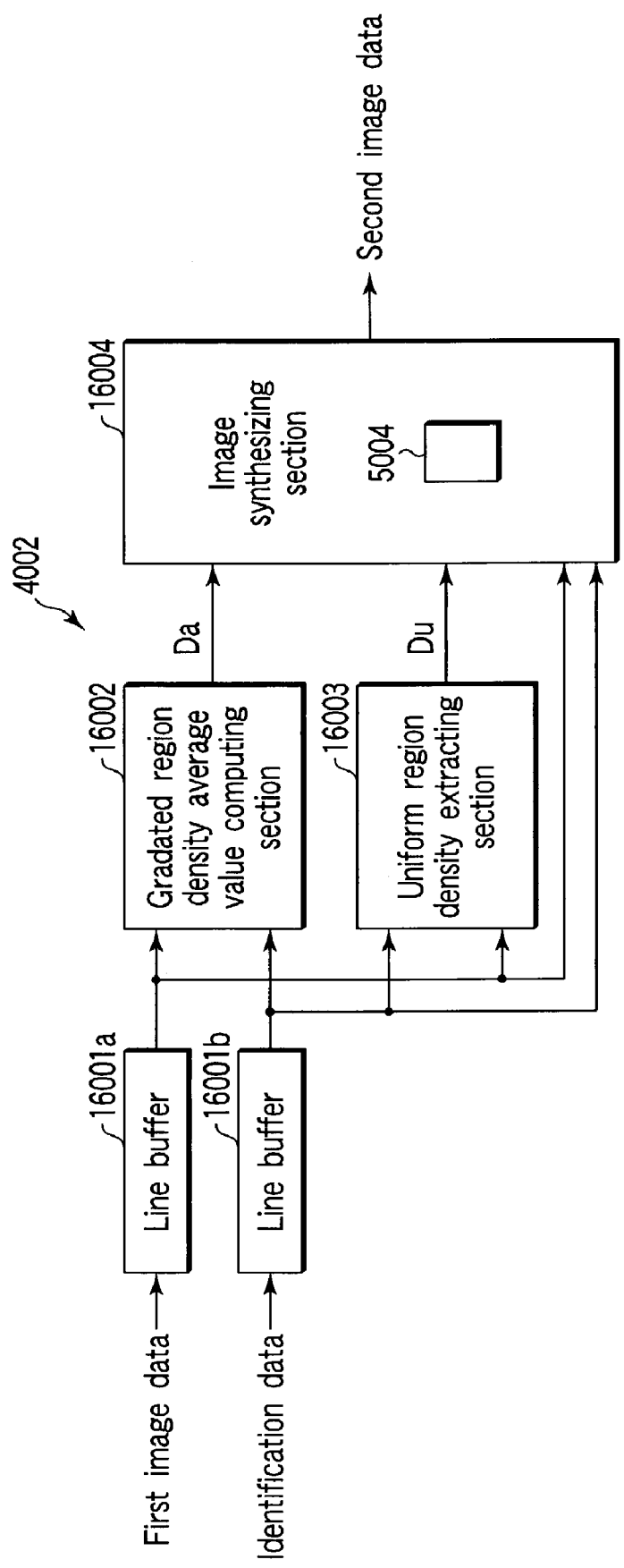
F I G. 16

| Condition | Gradated region | Uniform region |
|---|---|---|
| Da<Td and Du<Td and Da<Du | 0 | Du |
| Da<Td and Du<Td and Da>Du | Dg | 0 |
| Colors are made to overlap as in first embodiment when neither of the requirements is met | | |

FIG. 18

| Condition | Gradated region | Uniform region |
|---|---|---|
| Dmax<Td and Du<Td and Dmin<Du | 0 | Du |
| Dmax<Td and Du<Td and Dmin>Du | Dg | 0 |
| Colors are made to overlap as in second embodiment when neither of the requirements is met | | |

FIG. 21

| Condition | Gradated region | Uniform region |
|---|---|---|
| Uniform region is character region and Da>Du | Dg | Du |
| Uniform region is character region and Da<Du | Dg | Du+Da |
| When uniform region is drawn image region, a processing operation the same as that of first embodiment is performed | | |

FIG. 24

IMAGE PROCESSING APPARATUS AND IMAGE FORMING APPARATUS AND IMAGE PROCESSING METHOD AND IMAGE FORMING METHOD

BACKGROUND OF THE INVENTION

The invention relates to an image processing apparatus for processing image data to be used in a color copying machine or a color printer adapted to generate a color print by using a plurality of color form plates, and also to an image forming apparatus for forming an image according to the image data processed by such an image processing apparatus.

Conventionally, four process color inks of cyan, magenta, yellow and black are used for printing using a plurality of color form plates. However, the printing is accompanied by the problem of misregistration. Trapping is an image processing operation of correcting the shining blank area produced by misregistration.

However a color edge can be formed along the boundary of two adjacent regions as the adjacent regions overlap each other as a result of trapping. The color edge can be more visible than the white ground and hence do more harm than good.

A technique for eliminating such a problem is disclosed in Jpn. Pat. Appln. KOKAI Publication No. 2000-196906. It is a technique of deciding the new color to be used as replacement for trapping and the position where the new color is placed based on the combination of the colors of the color regions so that a visually least noticeable line may appear.

However, the direction in which misregistration occurs is not constant and it is not predictable in which direction misregistration will occur. With the above cited technique, a trapping operation is conducted for each pixel of each of the regions only based on color information, and the misregistration, if any, along the boundary is not taken into consideration. Therefore, if trapping operations are conducted for an image showing gradations, there can occur a problem that the pixels that have been subjected to trapping are displaced to make the boundary line less smooth and the shining blank area cannot be handled.

BRIEF SUMMARY OF THE INVENTION

Therefore, an object of the invention is to provide an image processing apparatus and an image forming apparatus as well as an image processing method and an image forming method that can alleviate the problem of the shining blank area and that of changed contour if an image showing gradations is subjected to trapping.

According to the present invention, the above object is achieved by providing an image forming apparatus comprising:

an image developing means for generating first image data for a plurality of color form plates and identification data representing the attributes of their pixels;

a trapping means for performing a trapping processing operation with reference to the first image data and the identification data supplied from the image developing means and outputting second image data;

an image processing means for performing an image processing operation based on the second image data output from the trapping means and the identification data supplied from the image developing means; and an image outputting means for outputting the image data processed by the image processing means.

The present invention may also provide an image processing apparatus for receiving as input first image data for a plurality of color form plates and identification data representing the attributes of their pixels generated by an image developing means and performing an image processing operation, the apparatus comprising:

a density value computing section which computes the density values of the gradated region with reference to a predetermined region of the first image data and its identification data supplied from the image developing means;

an extracting section which extracts the density of the uniform region with reference to a predetermined region of the first image data and its identification data supplied from the image developing means;

an image synthesizing section which outputs second image data based on the density values computed by the density value computing section, the density of the uniform region extracted by the extracting section and the first image data and its identification data supplied from the image developing means; and an image processing section which performs an image processing operation based on the second image data output from the image synthesizing section and the identification data supplied from the image developing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a diagram showing the configuration of the gradated region average value computing section;

FIG. 4 is a diagram showing the configuration of the uniform region density extracting section;

FIG. 12 is a diagram showing the configuration of the gradated region maximum value computing section;

FIG. 13 is a diagram showing the configuration of the uniform region density extracting section;

FIG. 14 is a diagram showing the configuration of the image synthesizing section of the second embodiment;

FIG. 15 is an illustration showing the operation of the image synthesizing section of the second embodiment;

FIG. 16 is a block diagram showing the configuration of the trapping means of the third embodiment;

FIG. 18 is an illustration showing the operation of the image synthesizing section of the third embodiment;

FIG. 21 is an illustration showing the operation of the image synthesizing section of the fourth embodiment;

FIG. 24 illustrates the operation of the selector conducted as a function of the identification signal of a uniform region.

DETAILED DESCRIPTION OF THE INVENTION

Now, an embodiment of the present invention will be described with reference to the accompanying drawings.

Figure 1:
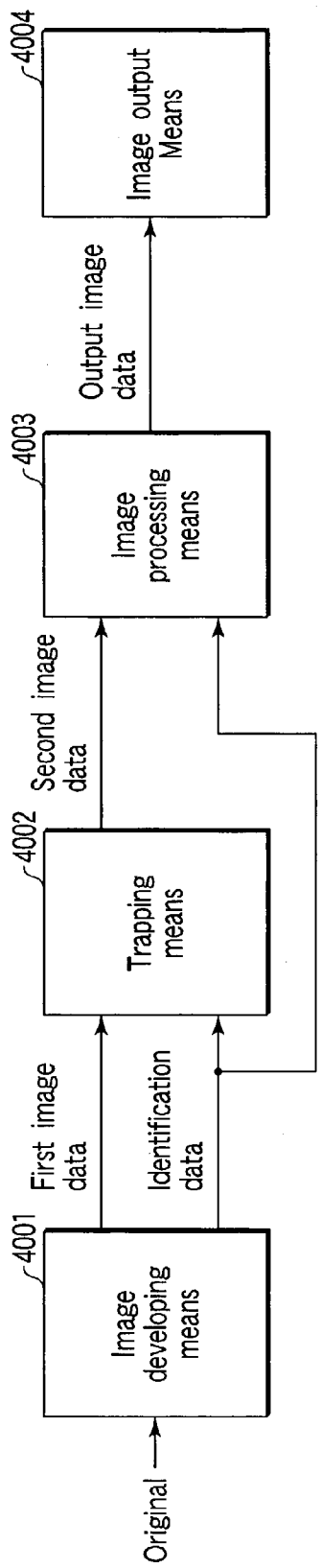
FIG. 1 is a diagram showing the schematic configuration of an image forming apparatus according to the invention.

FIG. 1 is a diagram showing schematic configuration of an image forming apparatus according to the invention. The image forming apparatus comprises an image developing means 4001, a trapping means 4002, an image processing means 4003 and an image outputting means 4004. An image processing apparatus according to the invention comprises a trapping means 4002 and an image processing means (image processing section) 4003.

The image developing means 4001 is typically a scanner adapted to read an original and acquire an image thereof. It has a printer controller and an identification means and generates first image data as bitmap data and identification data that represents the attributes of pixels.

The trapping means 4002 is adapted to perform a trapping processing operation, considering a situation where shining blank areas can appear in the output of the printer due to misregistration of color form plates based on the identification data generated by the image developing means 4001, and generate second image data.

The image processing means 4003 is adapted to perform a processing operation for emphasizing the image output from the printer. Specific techniques that the image processing means 4003 uses generally include filtering and gamma correction. It selectively uses filter factors and gamma correction tables according to the identification data.

The image output means 4004 outputs an image by applying inks to a sheet of paper according to the output image data generated by the image processing means 4003.

Now, the first embodiment of the present invention will be described below.

Figure 2:
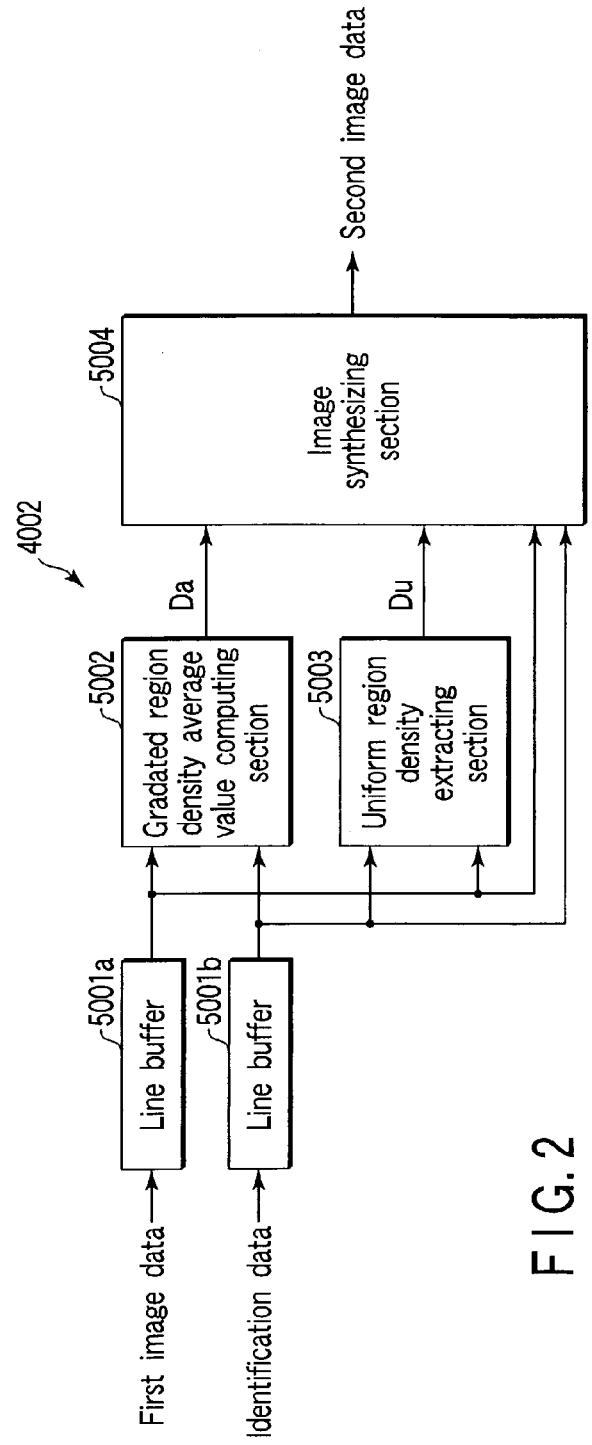
FIG. 2 is a block diagram showing the configuration of the trapping means of the first embodiment.

FIG. 2 is a block diagram showing configuration of the trapping means 4002 of the first embodiment. The trapping means 4002 includes line buffers 5001a, 5001b, a gradated region density average value computing section 5002, a uniform region density extracting section 5003 and an image synthesizing section 5004.

The entered first image data is input to the line buffer 5001a. The first image data is accumulated in the line buffer 5001a for several lines to make block data.

The entered identification data is input to the line buffer 5001b. The identification data is accumulated in the line buffer 5001b for several lines to make block data.

The gradated region density average value computing section 5002 computes the average value Da of the ink densities of the gradated region from the first image data output from the line buffer 5001a based on the identification data output from the line buffer 5001b.

The uniform region density extracting section 5003 extracts the ink density value Du of the uniform region from the first image data output from the line buffer 5001a based on the identification data output from the line buffer 5001b.

The image synthesizing section 5004 outputs the second image data based on the density average value Da of the gradated region, the ink density Du of the uniform region and the identification data output from the line buffer 5001b. In this way, the trapping means 4002 performs a trapping processing operation on the first image data and outputs the second image data.

FIG. 3 is a diagram showing configuration of the gradated region density average value computing section 5002. As shown in FIG. 3, the gradated region density average value computing section 5002 includes a NOT circuit 6001, a multiplier 6002, adders 6003a, 6003b and a divider 6004. Note that the pixel attribute of a gradated region is represented by "0", whereas the pixel attribute of a uniform region is represented by "1".

The NOT circuit 6001 outputs a signal obtained by inverting the input identification data (having the value of "0" or "1").

The multiplier 6002 receives as input the first image data and the identification data from the NOT circuit 6001 and outputs a signal obtained by converting all the ink density values of the uniform region to "0".

The adder 6003a computes the sum Dtot of the density values of the gradated region by computing the sum of the input signals in the block.

The adder 6003b computes the number of pixels N of the gradated region in the block by computing the sum of the inverted signal values of the identification data from the NOT circuit 6001.

The divider 6004 receives as input the sum Dtot of the ink density of the gradated region from the adder 6003a and the number of pixels N of the gradated region from the adder 6003b and computes the density average value Da=Dtot/N of the gradated region.

FIG. 4 is a diagram showing configuration of the uniform region density extracting section 5003. As shown in FIG. 4, the uniform region density extracting section 5003 includes a multiplier 7001, adders 7002a, 7002b and a divider 7003. Note that the pixel attribute of a gradated region is represented by "0", whereas the pixel attribute of a uniform region is represented by "1".

The multiplier 7001 receives as input the first image data and its identification data and outputs a signal obtained by converting all the ink density values of the gradated region of the first image data to "0".

The adder 7002a computes the sum Dtot of the density values of the uniform region by computing the sum of the input signals in the block.

The adder 7002b computes the number of pixels N of the uniform region in the block by computing the sum of the identification data.

The divider 7003 receives as input the sum Dtot of the ink density of the uniform region from the adder 7002a and the number of pixels N of the gradated region from the adder 7002b and computes the density value Du=Dtot/N of the uniform region.

Figures 5, 6:
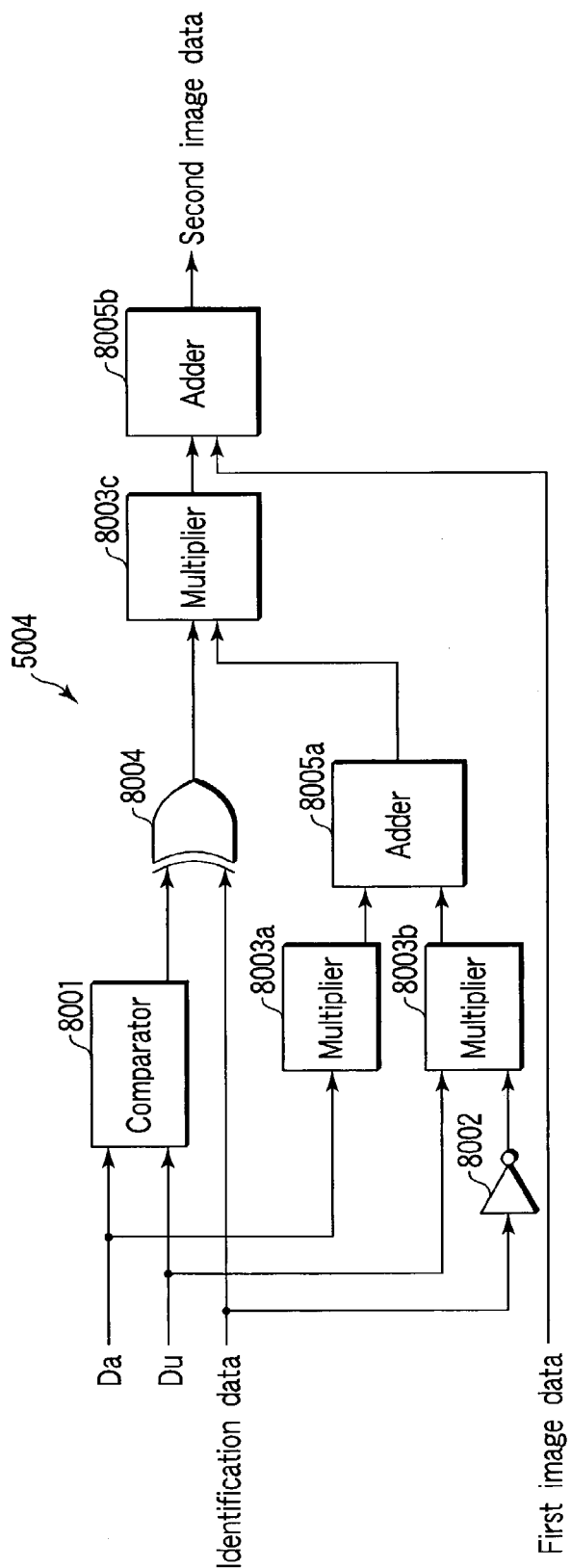
FIG. 5 is a diagram showing the configuration of the image synthesizing section of the first embodiment.
FIG. 6 is an illustration showing the operation of the image synthesizing section of the first embodiment.

FIG. 5 is a diagram showing configuration of the image synthesizing section 5004. As shown in FIG. 5, the image synthesizing section 5004 includes a comparator 8001, a NOT circuit 8002, multipliers 8003a, 8003b, 8003c, an EXOR circuit 8004 and adders 8005a, 8005b.

The comparator 8001 receives as input the density average value Da of the gradated region and the density value Du of the uniform region and outputs "1" when Da>Du holds true but outputs "0" when Da>Du does not hold true.

The EXOR circuit 8004 receives as input the outcome of comparison from the comparator 8001 and the identification data and outputs a signal obtained by inverting the identification data when Da>Du holds true but outputs a signal identical with the identification data when Da>Du does not hold true.

The NOT circuit 8002 receives as input the identification data, inverts the identification data and outputs a signal in which "1" represents the gradated region and "0" represents the uniform region.

The multiplier 8003a receives as input the density value Da of the uniform region and generates a signal showing "0" for the density value of the gradated region.

The multiplier 8003b receives as input the signal obtained by inverting the identification data from the NOT circuit 8002 and the density value Du of the uniform region and multiplies each of the elements of the inverted identification data by Du. As a result, the multiplier 8003b generates a signal in which the density value of the gradated region is "Du" and the density value of the uniform region is "0".

The adder 8005a receives as input the signal from the multiplier 8003a and the signal from the multiplier 8003b and computes the sum of the pixels. As a result, the adder 8005a generates a signal in which the density value of the gradated region is "Du" and the density value of the gradated region is "Da".

The multiplier 8003c receives as input the signal from the EXOR circuit 8004 and the signal from the adder 8005a and multiplies the two input signals for each pixel in the block. As a result, the multiplier 8003c generates image data in which the density value of the gradated region is "Du" and the density value of the uniform region is "0" when Da>Du holds true but generates image data in which the density value of the gradated region is "0" and the density value of the uniform region is "Da" when Da>Du does not hold true.

The adder 8005b receives as input the image data from the multiplier 8003c and the first image data and determines the sum of the pixel values, which is then output from it. When Da>Du holds true, the adder 8005b generates second image data in which the density value of the gradated region is the sum of the density values Dg and Du of the gradated region of the first image data and the density value of the uniform region is Du. When Da>Du does not hold true, the adder 8005b generates second image data in which the density value of the gradated region is equal to the density value of the first image data and the density value of the uniform region is Da+Du.

FIG. 6 schematically illustrates the ink density of the gradated region and that of the uniform region when a trapping processing operation is performed by the image synthesizing section 5004 of the first embodiment.

If the density average value Da of the gradated region is greater than the density value Du of the uniform region, the image synthesizing section 5004 so judges that the gradated region is darker than the uniform region and causes colors to overlap by expanding the uniform region. In other words, a second image data in which the density value of the gradated region is the sum of the gradated region data Dg and the uniform region data Du and the density value of the uniform region is Du is output.

Conversely, if the density average value Da of the gradated region is smaller than the density value Du of the uniform region, the image synthesizing section 5004 so judges that the gradated region is lighter than the uniform region and expands the gradated region. In other words, a second image data in which the density value of the gradated region is equal to the density value of the first image data and the density value of the uniform region is the sum of the density value Du of the uniform region and the density average value Da of the gradated region is output.

If the density average value Da of the gradated region is equal to the density value Du of the uniform region, the image synthesizing section 5004 expands both the gradated region and the uniform region.

FIGS. 7 through 10 schematically illustrate the effect of a trapping processing operation of the first embodiment.

Figure 7:
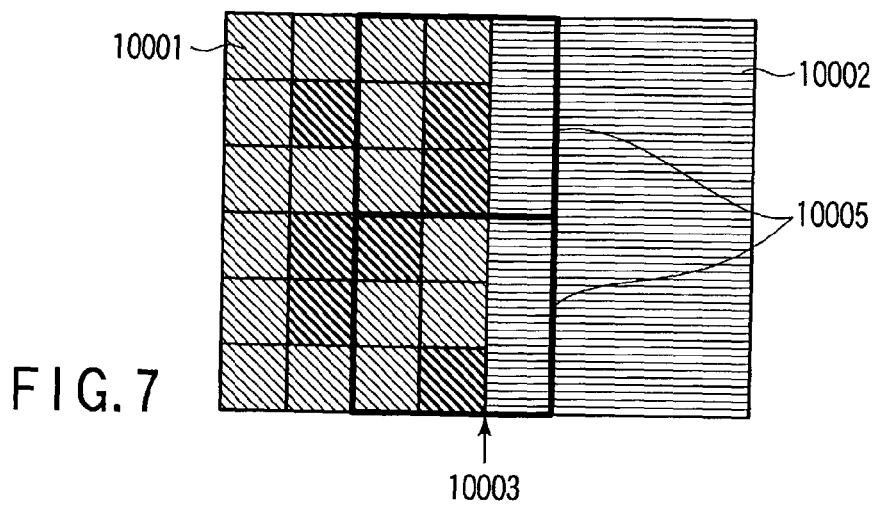
FIG. 7 is an illustration explaining the outcome of a trapping processing operation.

In FIG. 7, region 10001 is a region having a gradation of the primary color of cyan including pale cyan and dark cyan. Region 10002 is a region of the primary color of magenta that is darker than pale cyan and lighter than dark cyan. The region 10001 and the region 10002 share a boundary line 10003. A broad reference region 10005 is provided so as to be referred to.

Figure 8:
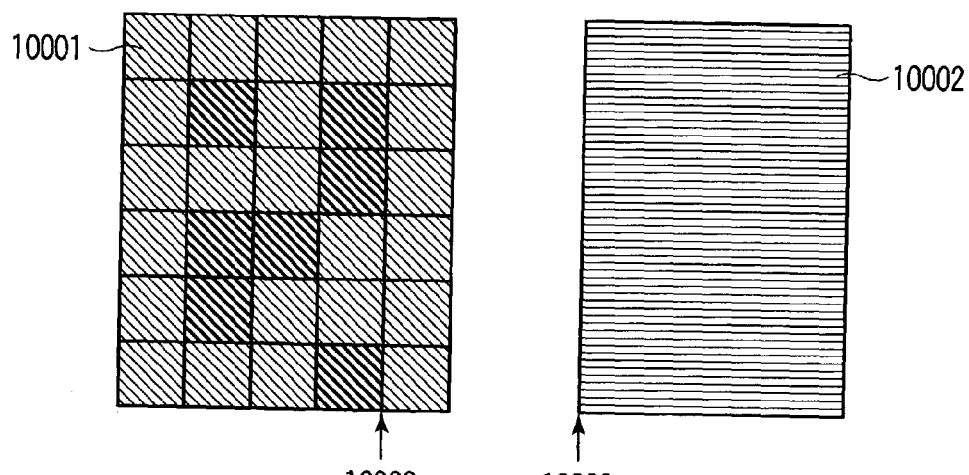
FIG. 8 is an illustration explaining the outcome of a trapping processing operation.
Figure 9:
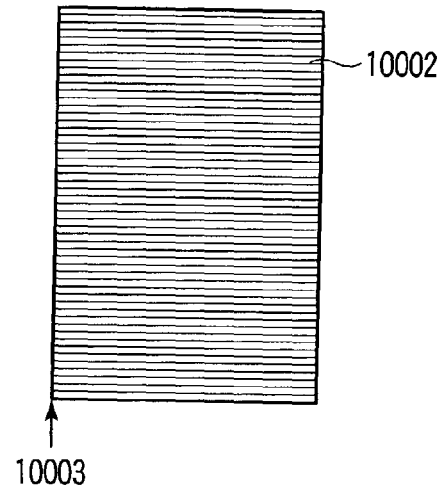
FIG. 9 is an illustration explaining the outcome of a trapping processing operation.

When a trapping processing operation is performed as described above, the region 10001 is expanded as shown in FIG. 8 (to move the boundary line 10003 rightward in FIG. 8), whereas the region 10002 is not expanded as shown in FIG. 9.

Figure 10:
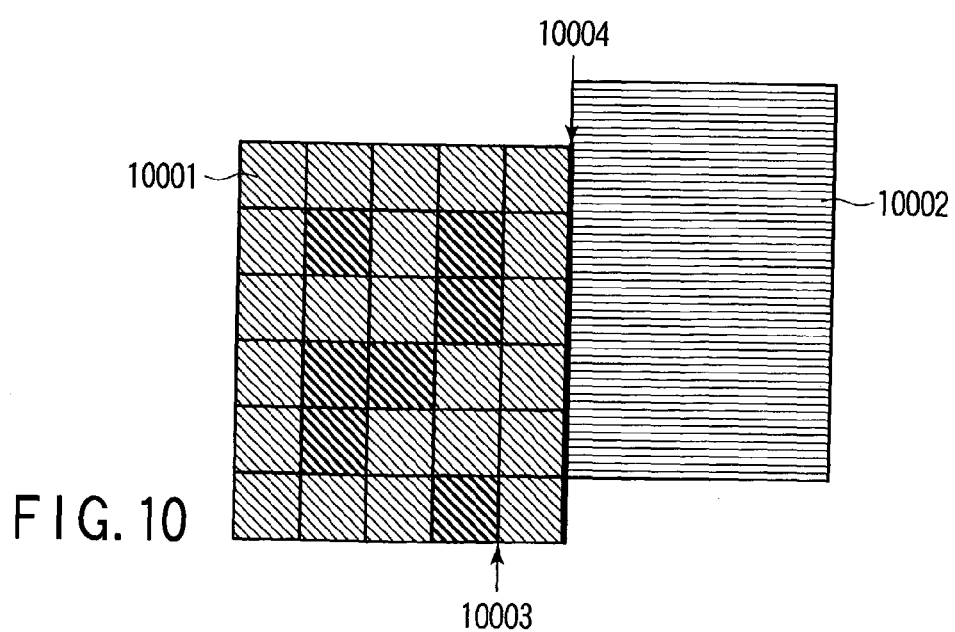
FIG. 10 is an illustration explaining the outcome of a trapping processing operation.

With this arrangement, if cyan is misregistered and displaced leftward and downward, no shining blank area is produced and the new boundary line 10004 remains a straight line as shown in FIG. 10.

As described above, the first embodiment can adapt itself to misregistration that takes place in any direction as a result of a trapping processing operation performed with reference to a broad reference region.

Now, the second embodiment of the present invention will be described below.

Figure 11:
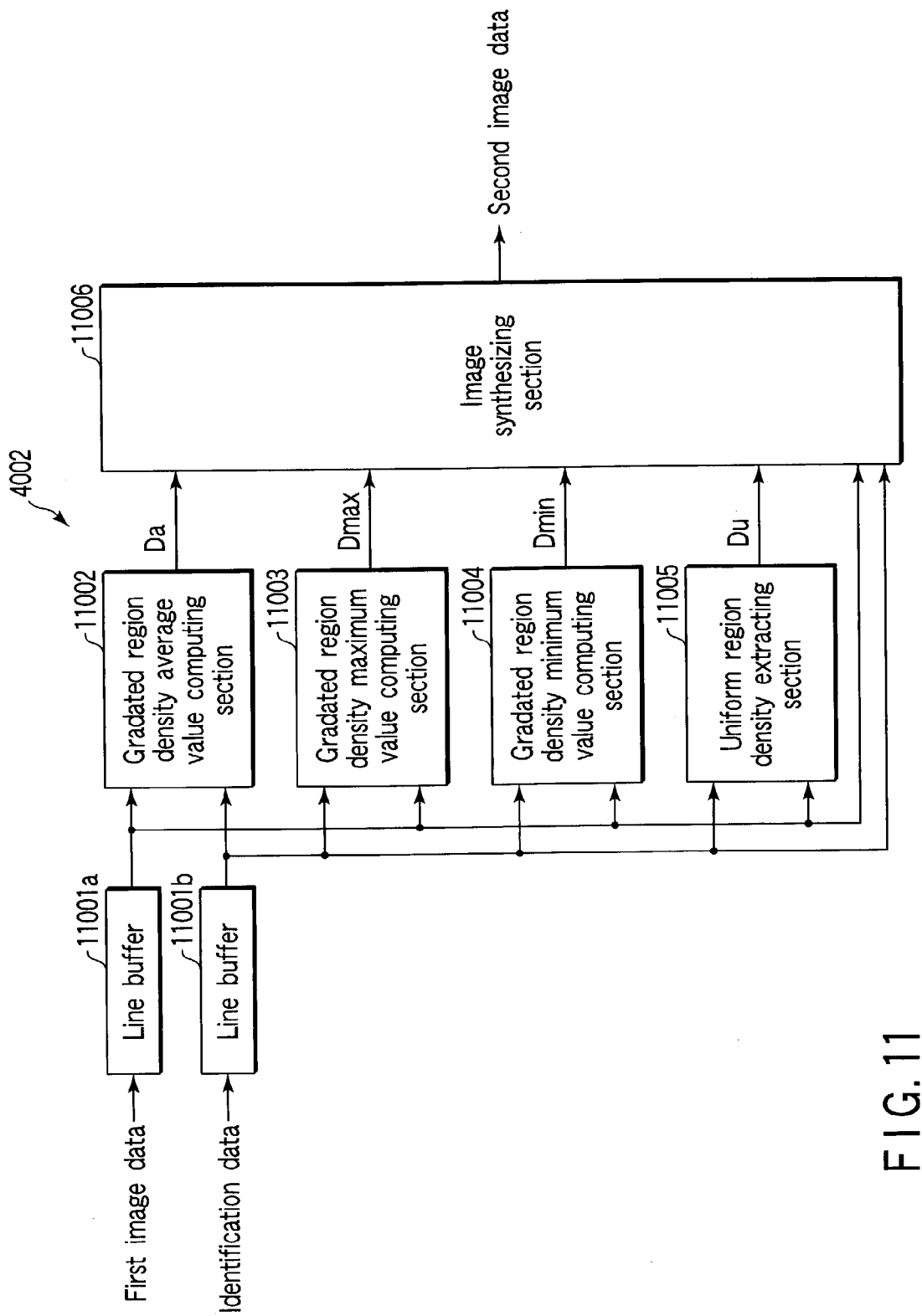
FIG. 11 is a block diagram showing the configuration of the trapping means of the second embodiment.

FIG. 11 is a block diagram showing configuration of the trapping means 4002 of the second embodiment. The trapping means 4002 of the second embodiment includes line buffers 11001a, 1100ab, a gradated region density average value computing section 11002, a gradated region density maximum value computing section 11003, a gradated region density minimum value computing section 11004, a uniform region density extracting section 11005 and an image synthesizing section 11006.

The second embodiment significantly differs from the first embodiment in that it additionally comprises a gradated region density maximum value computing section 11003 and a gradated region density minimum value computing section 11004. The image synthesizing section 11006 performs a trapping processing operation based on the density average value Da, the density maximum value Dmax and the density minimum value Dmin of the gradated region, the ink density Du of the uniform region and the identification data.

Since the line buffers 11001a, 11001b, the gradated region density average value computing section 11002 and the uniform region density extracting section 11005 are respectively identical with the line buffers 5001a, 5001b, the gradated region density average value computing section 5002 and the uniform region density extracting section 5003 of the first embodiment in terms of configuration and hence will not be described any further.

Alternatively, the density value computing part of the second embodiment may be made to include a gradated region density average value computing section 11002, a gradated region density maximum value computing section 11003 and a gradated region density minimum value computing section 11004. Then, the density value computing part computes the density average value, the density maximum value and the density minimum value of the gradated region.

FIG. 12 is a diagram showing configuration of the gradated region density maximum value computing section 11003. The gradated region density maximum value computing section 11003 includes a NOT circuit 12001, a multiplier 12002 and a maximum value calculator 12003. Note that the pixel attribute of a gradated region is represented by "0", whereas the pixel attribute of a uniform region is represented by "1".

The NOT circuit 12001 receives as input the identification data and outputs a signal obtained by inverting the input identification data in such a way that the gradated region is represented by "1" and the uniform region is represented by "0".

The multiplier 12002 receives as input the first image data and the signal from the NOT circuit 12001 and outputs a signal obtained by converting all the ink density values of the uniform region of the first image data to "0".

The maximum value calculator 12003 outputs the maximum value Dmax of the density values of the gradated region by computing the maximum value of the input signals in the block.

FIG. 13 is a diagram showing configuration of the gradated region density minimum value computing section 11004. The gradated region density minimum value computing section 11004 includes a NOT circuit 13001, multipliers 13002*a*, 13002*b*, an adder 13003 and a minimum value calculator 13004. Note that the pixel attribute of a gradated region is represented by "0", whereas the pixel attribute of a uniform region is represented by "1".

The NOT circuit 13001 receives as input the identification data and outputs a signal obtained by inverting the input identification data in such a way that the gradated region is represented by "1" and the uniform region is represented by "0".

The multiplier 13002*a* receives as input the first image data and the signal from the NOT circuit 12001 and outputs a signal obtained by converting all the ink density values of the uniform region of the first image data to "0".

The multiplier 13002*b* outputs a signal in which "0" represents the pixel value of the gradated region and "0" represents the pixel value of the uniform region by determining the product of multiplication of the identification data and "255".

The adder 13003 receives as input the signal from the multiplier 13002*a* and the signal from the multiplier 13002*b* and determines the sum of the values of the signals. Then, the adder 13003 outputs the image data obtained by converting the density value of the pixels of the uniform region of the first image data to "255".

The minimum value calculator 13004 outputs the minimum value Dmin of the density values of the gradated region by computing the minimum value of the input signals in the block.

FIG. 14 is a diagram showing configuration of the image synthesizing section 11006. The image synthesizing section 11006 includes comparators 14001*a*, 14001*b*, 14001*c*, NOT circuits 14002*a*, 14002*b*, multipliers 14003*a*, 14003*b*, 14003*c*, an EXOR circuit 14004 and adders 14005*a*, 14005*b*.

The comparator 14001*a* receives as input the density average value Da of the gradated region and the density value Du of the uniform region and outputs "1" when Da>Du holds true but outputs "0" when Da>Du does not hold true.

The EXOR circuit 14004 receives as input the outcome of comparison from the comparator 14001*a* and the identification data and outputs a signal obtained by inverting the identification data when the outcome of comparison is "1" but outputs a signal the same as the identification data when the outcome of comparison is "0".

The NOT circuit 14002*a* receives as input the identification data and outputs a signal in which "1" represents the gradated region and "0" represents the uniform region obtained by inverting the identification data.

The multiplier 14003*a* receives as input the signal obtained by inverting the identification signal as output from the NOT circuit 14002 and the density value Da of the gradated region and generates and outputs a signal obtained by multiplying each element of the inverted identification data by Da, in which Da represents the density value of the gradated region and "0" represents the density value of the uniform region.

The multiplier 14003*b* receives as input the identification signal and the density value Du of the uniform region and generates and outputs a signal obtained by multiplying each element of the identification data by Du, in which Du represents the density value of the uniform region and "0" represents the density value of the gradated region.

The adder 14005*a* receives as input the signal output from the multiplier 14003*a* and the signal output from the multiplier 14003*b* and determines the sum of the pixels. As a result, the adder 14005*a* generates and outputs a signal, in which Du represents the density value of the uniform region and Da represents the density value of the gradated region.

The comparator 14001*b* receives as input the density maximum value Dmax of the gradated region and the density value Du of the uniform region and outputs "1" when Dmax>Du holds true but outputs "0" when Dmax>Du does not hold true.

The comparator 14001*c* receives as input the density maximum value Dmin of the gradated region and the density value Du of the uniform region and outputs "1" when Dmm>Du holds true but outputs "0" when Dmin>Du does not hold true.

The NOT circuit 14002*b* inverts the output from the comparator 14001*c*.

The multiplier 14003*c* receives as input the signal from the comparator 14001*b*, the signal from the NOT circuit 14002*b*, the signal from the EXOR circuit 14004 and the signal from the adder 14005*a* and determines the product of multiplication of the four input signals for each pixel in the block. Then, when Dmax>Du>Dmin, the multiplier 14003*c* generates and outputs image data, in which the density values of all the pixels in the block are equal to "0". When Dmax<Du or Du<Dmin and Da>Du, the multiplier 14003*c* generates and outputs image data, in which the density value of the gradated region is Du and the density value of the uniform region is "0". In any other case, the multiplier 14003*c* generates and outputs image data, in which the density value of the gradated region is "0" and the density value of the uniform region is Da.

The adder 14005*b* receives as input the image data from the multiplier 14003*c* and the first image data and outputs second image data by determining the sum of the pixel values thereof. When Dmax>Du>Dmin, the adder 14005*b* generates and outputs second image data, in which the density values of all the pixels in the block are same as those of the first image data. When Dmax<Du or Du<Dmin and Da>Du, the adder 14005*b* generates and outputs second image data, in which the density value of the gradated region is equal to the sum of the density value of the gradated region of the first image data and Du and the density value of the uniform region is Du. In any other cases, the adder 14005*b* generates and outputs second image data, in which the density value of the gradated region is equal to the density value of the first image data and the density value of the uniform region is Da+Du.

FIG. 15 is an illustration showing the operation of synthesizing the first image data of the image synthesizing section 11006 of the second embodiment based on the density average value Da, the density maximum value Dmax and the density minimum value Dmin of the gradated region and the identification data.

If the density minimum value Dmin is greater than the density value Du of the uniform region and hence the lightest pixel in the inside of the gradated region is dark if compared with the uniform region, the image synthesizing section 11006 causes colors to overlap by expanding the uniform region. As a result, second image data, in which the density value of the gradated region is equal to the sum of the gradated region data Dg and the uniform region data Du and the density value of the uniform region is equal to Du, is output.

Conversely, if the density maximum value Dmax is smaller than the density value Du of the uniform region and hence the darkest pixel in the inside of the gradated region is light if compared with the uniform region, the image synthesizing section 11006 expands the gradated region. As a result, second image data, in which the density value of the gradated region is equal to the density value Dg of the gradated region and the density value of the uniform region is equal to the sum of Du and the density average value Da of the gradated region, is output.

If neither of the above two requirements is met, no trapping processing operation is performed and the data the same as the first image data is output as second image data.

As described above, the second embodiment can adapt itself to misregistration that takes place in any direction as a result of a trapping processing operation performed with reference to a broad reference region.

Additionally, the risk of expanding the dark region is avoided because no trapping processing operation is performed by considering the density maximum value and the density minimum value in the reference region.

Furthermore, the shape of any region is not changed.

Now, the third embodiment will be described.

FIG. 16 is a block diagram showing configuration of the trapping means 4002 of the third embodiment. The trapping means 4002 of the third embodiment includes line buffers 16001*a*, 16001*b*, a gradated region density average value computing section 16002, a uniform region density extracting section 16003 and an image synthesizing section 16004.

Since the line buffers 16001*a*, 16001*b*, the gradated region density average value computing section 16002 and the uniform region density extracting section 16003 are respectively identical with the line buffers 5001*a*, 5001*b*, the gradated region density average value computing section 5002 and the uniform region density extracting section 5003 of the first embodiment in terms of configuration and hence will not be described any further.

The image synthesizing section 16004 includes the image synthesizing section 5004 of the first embodiment.

Figure 17:
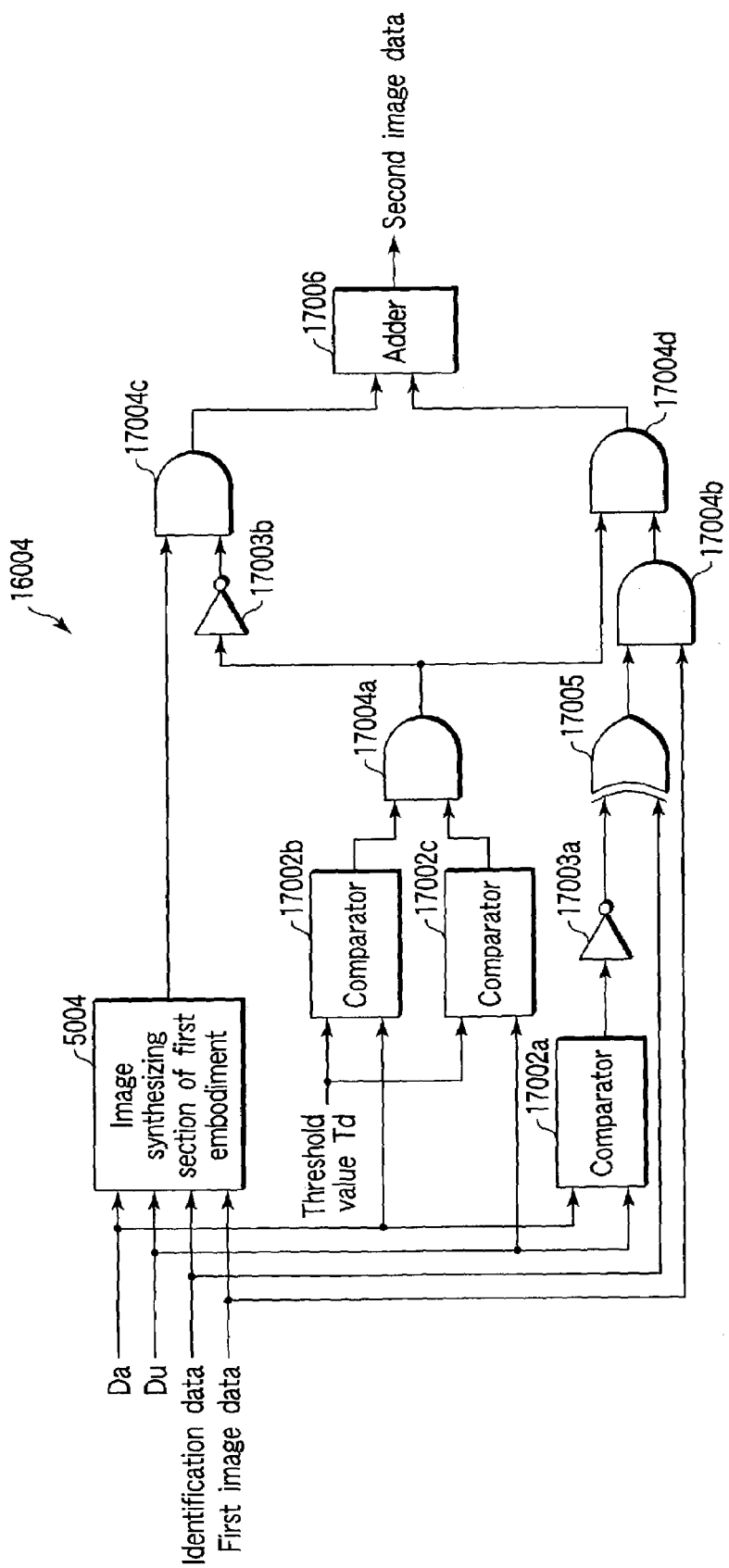
FIG. 17 is a block diagram showing the configuration of the image synthesizing section of the third embodiment.

FIG. 17 is a block diagram showing configuration of the image synthesizing section 16004. The image synthesizing section 16004 includes the synthesizing section 5004 of the first embodiment, comparators 17002*a*, 17002*b*, 17002*c*, NOT circuits 17003*a*, 17003*b*, AND circuits 17004*a*, 17004*b*, 17004*c*, 17004*d*, an EXOR circuit 17005 and an adder 17006.

The image synthesizing section 5004 of the first embodiment receives as input the density average value Da of the gradated region, the density value Du of the uniform region, the identification data and the first image data and outputs image data subjected to a trapping processing operation as in the case of the second image data of the first embodiment.

The comparator 17002*a* receives as input the density average value Da of the gradated region and the density value Du of the uniform region and outputs "1" when Da>Du holds true but outputs "0" when Da>Du does not hold true.

The NOT circuit 17003*a* receives as input the signal output from the comparator 17002*a* and outputs "0" when Da>Du holds true but outputs "1" when Da>Du does not hold true.

The EXOR circuit 17005 receives as input the signal output from the NOT circuit 17003*a* and the identification signal and outputs data identical with the identification data when Da>Du holds true but outputs data obtained by inverting the identification data when Da>Du does not hold true.

The AND circuit 17004*b* receives as input the data output from the EXOR circuit 17005 and the first image data and outputs image data obtained by converting the density value of the gradated region of the first image data to "0" when Da>Du holds true but outputs image data obtained by converting the density value of the uniform region of the first image data to "0" when Da>Du does not hold true.

The comparator 17002*b* receives as input a threshold value Td and Da and outputs "1" when Td>Da holds true but outputs "0" when Td>Da does not hold true.

The comparator 17002*c* receives as input a threshold value Td and the density value Du of the uniform region and outputs "1" when Td>Du holds true but outputs "0" when Td>Du does not hold true.

The AND circuit 17004*a* receives as input the signal output from the comparator 17002*b* and the signal output from the comparator 17002*c* and outputs "1" when Td>Da and Td>Du hold true but outputs "0" when Td>Da and Td>Du do not hold true.

The NOT circuit 17003*b* receives as input the signal output from the AND circuit 17004*a* and outputs "0" when Td>Da and Td>Du hold true but outputs "1" when Td>Da and Td>Du do not hold true.

The AND circuit 17004*c* receives as input the image data output from the image synthesizing section 5004 of the first embodiment and the signal output from the NOT circuit 17003*b* and outputs image data, in which the density values of all the pixels in the block are equal to "0", when Td>Da and Td>Du hold true. The AND circuit 17004*c* outputs the image data output from the image synthesizing section 5004 of the first embodiment when Td>Da and Td>Du do not hold true.

The AND circuit 17004*d* receives as input the signal output from the AND circuit 17004*a* and the image data output from the AND circuit 17004*b* and outputs image data obtained by converting the density value of the gradated region of the first image data to "0" when Td>Da and Td>Du hold true and Da>Du. The AND circuit 17004*d* outputs image data obtained by converting the density value of the uniform region of the first image data to "0" when Td>Da and Td>Du hold true but Da>Du does not hold true. In any other cases, the AND circuit 17004*d* outputs image data, in which density values of all the pixels in the block are equal to "0".

The adder 17006 receives as input the image data output from the AND circuit 17004*c* and the image data output from 17005*d* and determines the sum of them, which it outputs as second image data. When Td>Da and Td>Du hold true and Da>Du, image data obtained by converting the density value of the gradated region of the first image data to "0" is output as second image data. When Td>Da and Td>Du hold true and Da<Du, image data obtained by converting the density value of the uniform region of the first image data to "0" is output as second image data. When Td<Da or Td<Du, data similar to the corresponding data of the first embodiment is output as second image data.

FIG. 18 is an illustration showing the trapping processing operation of the image synthesizing section 16004 of the third embodiment performed on the first image data based on the density average value Da of the gradated region, the density value Du of the uniform region, the identification data and the density threshold value Td.

When the density threshold value Td is greater than the density average value Da and also greater than the density value Du of the uniform region, it is judged that the image quality is degraded more by overlapped colors due to misregistration than by a shining blank area due to misregistration and a lighter region is buried by white pixels.

If the density average value Da of the gradated region is greater than the density value Du of the uniform region under this condition, it is judged that the uniform region is light if compared with the gradated region and a second image data, in which the density values of all the pixels in the uniform region are equal to "0" and those in the gradated region are identical with those of the first image data, is output.

If the density average value Da is smaller than the density value Du of the uniform region, second image data, in which the density values of all the pixels in the gradated region are equal to "0" and those in the uniform region are identical with those of the first image data, is output.

If the density threshold value Td is smaller than the density average value Da or smaller than the density value Du of the uniform region, an image is synthesized in a manner similar to the one described above for the first embodiment.

As described above, the third embodiment can adapt itself to misregistration that takes place in any direction as a result of a trapping processing operation performed with reference to a broad reference region.

Additionally, it can adapt itself to both a shining blank area due to misregistration and overlapped colors due to misregistration as a result of providing a density threshold value.

Now, the fourth embodiment will be described.

Figure 19:
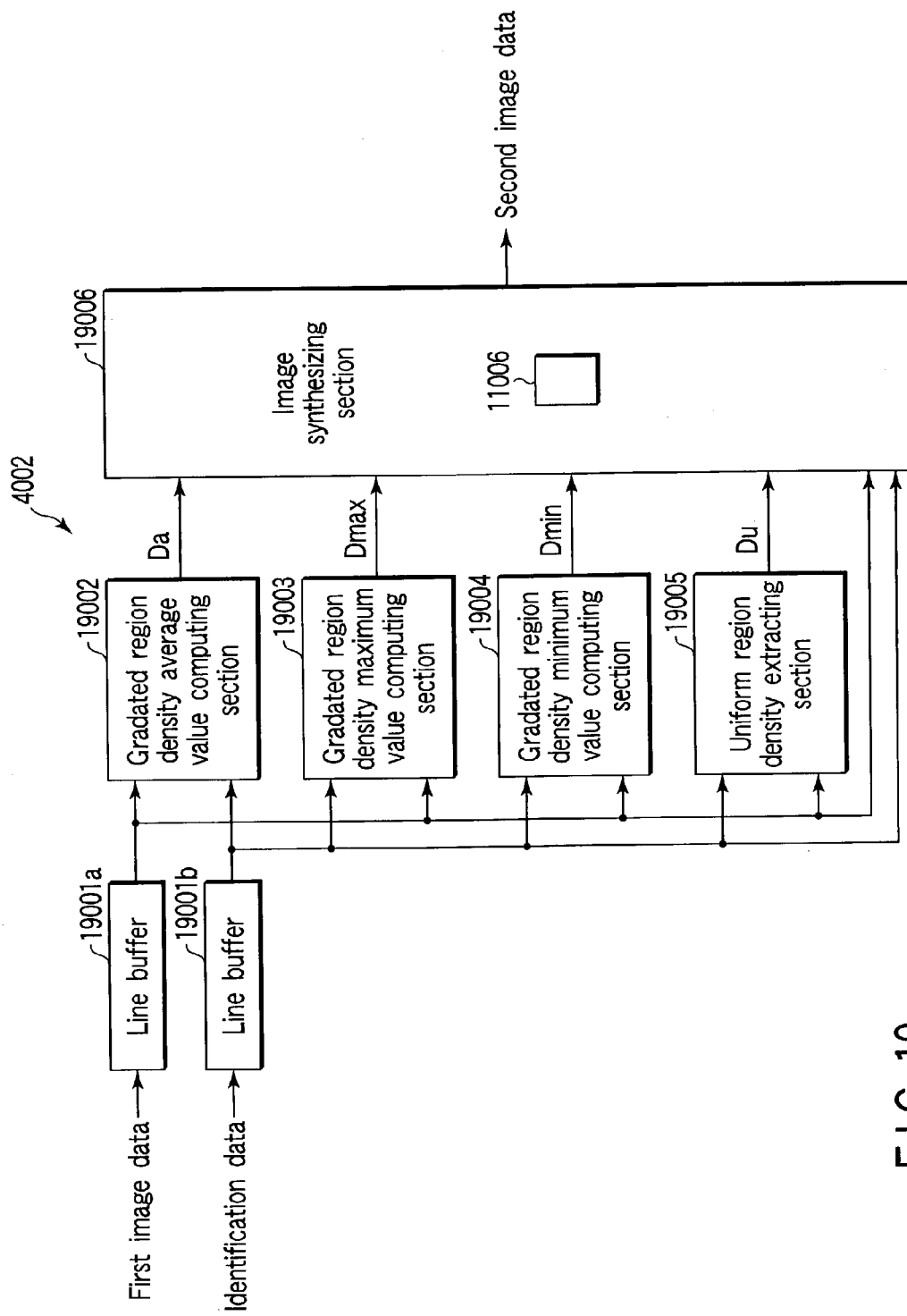
FIG. 19 is a block diagram showing the configuration of the trapping means of the fourth embodiment.

FIG. 19 is a block diagram showing configuration of the trapping means 4002 of the fourth embodiment. The trapping means 4002 of the fourth embodiment includes line buffers 19001*a*, 1900*ab*, a gradated region density average value computing section 19002, a gradated region density maximum value computing section 19003, a gradated region density minimum value computing section 19004, a uniform region density extracting section 19005 and an image synthesizing section 19006.

Since the line buffers 19001*a*, 1900*ab*, the gradated region density average value computing section 19002, the gradated region density maximum value computing section 19003, the gradated region density minimum value computing section 19004 and the uniform region density extracting section 19005 are identical respectively with the line buffers 11001*a*, 1100*ab*, the gradated region density average value computing section 11002, the gradated region density maximum value computing section 11003, the gradated region density minimum value computing section 11004 and the uniform region density extracting section 11005 of the second embodiment, they will not be described here any further.

The image synthesizing section 19006 includes the image synthesizing section 11006 of the second embodiment.

Figure 20:
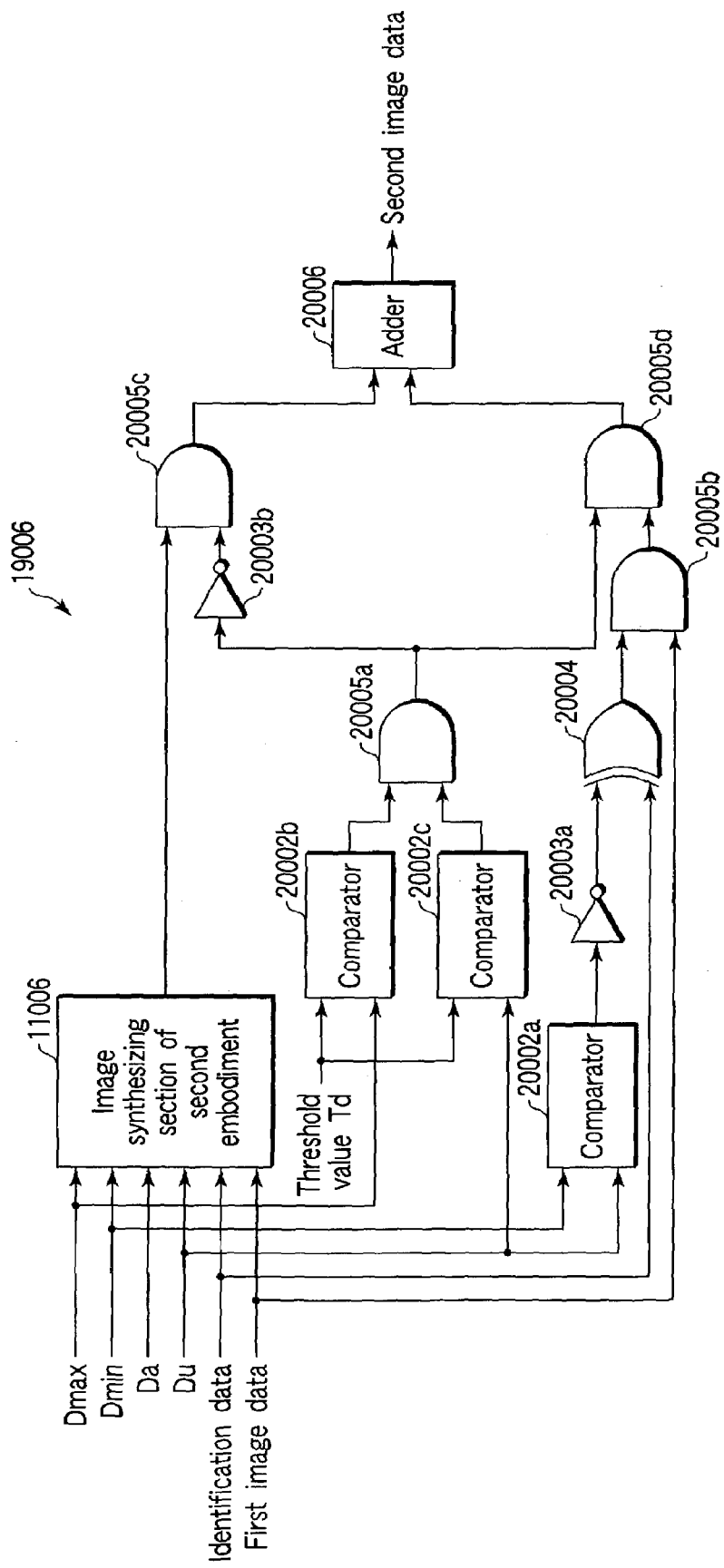
FIG. 20 is a block diagram showing the configuration of the image synthesizing section of the fourth embodiment.

FIG. 20 is a block diagram showing configuration of the image synthesizing section 19006. The image synthesizing section 19006 includes the image synthesizing section 11006 of the second embodiment, comparators 20002*a*, 20002*b*, 20002*c*, NOT circuits 20003*a*, 20003*b*, an EXOR circuit 20004, AND circuits 20005*a*, 20005*b*, 20005*c*, 20005*d* and an adder 20006.

The fourth embodiment differs from the third embodiment in that, while the third embodiment comprises the image synthesizing section 5004 of the first embodiment, the fourth embodiment comprises the image synthesizing section 11006 of the second embodiment. Additionally, while the density average value Da of the gradated region is one of the inputs of the comparator 17002*a* of the third embodiment, the density minimum value Dmin is the corresponding input to the comparator 20002*a* of the fourth embodiment. Furthermore, while the density average value Da of the gradated region is one of the inputs of the comparator 17002*b* of the third embodiment, the density maximum value Dmax is the corresponding input to the comparator 20002*b* of the fourth embodiment.

Since the comparators 20002*a*, 20002*b*, 20002*c*, the NOT circuits 20003*a*, 20003*b*, the EXOR circuit 20004, the AND circuits 20005*a*, 20005*b*, 20005*c*, 20005*d* and the adder 20006 are respectively identical with the comparators 17002*a*, 17002*b*, 17002*c*, the NOT circuits 17003*a*, 17003*b*, the AND circuits 17004*a*, 17004*b*, 17004*c*, 17004*d*, the EXOR circuit 17005 and the adder 17006, they will not be described here any further.

With the above arrangement, the trapping means 4002 of the fourth embodiment outputs an image data obtained by converting the density value of the gradated region of the first image data to "0" as second image data when Td>Dmax and Td>Du hold true and Dmin>Du.

The trapping means 4002 of the fourth embodiment outputs image data obtained by converting the density value of the uniform region of the first image data to "0" as second image data when Td>Dmax and Td>Du hold true and Dmin<Du.

The trapping means 4002 of the fourth embodiment outputs image data similar to the second image data of the second embodiment as its own second image data when Td<Dmax or Td<Du.

FIG. 21 is an illustration showing the trapping processing operation of the image synthesizing section 19006 of the fourth embodiment performed on the first image data based on the density average value Da, the density maximum value Dmax and the density minimum value Dmin of the gradated region, the density value Du of the uniform region, the identification data and the density threshold value Td.

When the density threshold value Td is greater than the density maximum value Dmax and also greater than the density value Du of the uniform region, it is judged that the image quality is degraded more by overlapped colors due to misregistration than by a shining blank area due to misregistration and a lighter region is buried by white pixels.

If the density minimum value Dmin of the gradated region is greater than the density value Du of the uniform region under this condition, it is judged that the uniform region is light if compared with the gradated region and second image data, in which the density values of all the pixels in the uniform region are equal to "0" and those in the gradated region are identical with those of the first image data, is output.

If the density minimum value Dmin is smaller than the density value Du of the uniform region, second image data, in which the density values of all the pixels in the gradated region are equal to "0" and those in the uniform region are identical with those of the first image data, is output.

If neither of the above two requirements is met, second image data the same as that of the second embodiment is synthesized and output.

As described above, the fourth embodiment can adapt itself to misregistration that takes place in any direction as a result of a trapping processing operation performed with reference to a broad reference region.

Additionally, the risk of expanding the dark region is avoided because no trapping processing operation is performed by considering the density maximum value and the density minimum value in the block data. Moreover, the change in the shape of any region is reduced.

Furthermore, it can prevent both a shining blank area due to misregistration and overlapped colors due to misregistration from taking place as a result of providing a density threshold value.

Now, the fifth embodiment will be described.

Figures 22, 23:
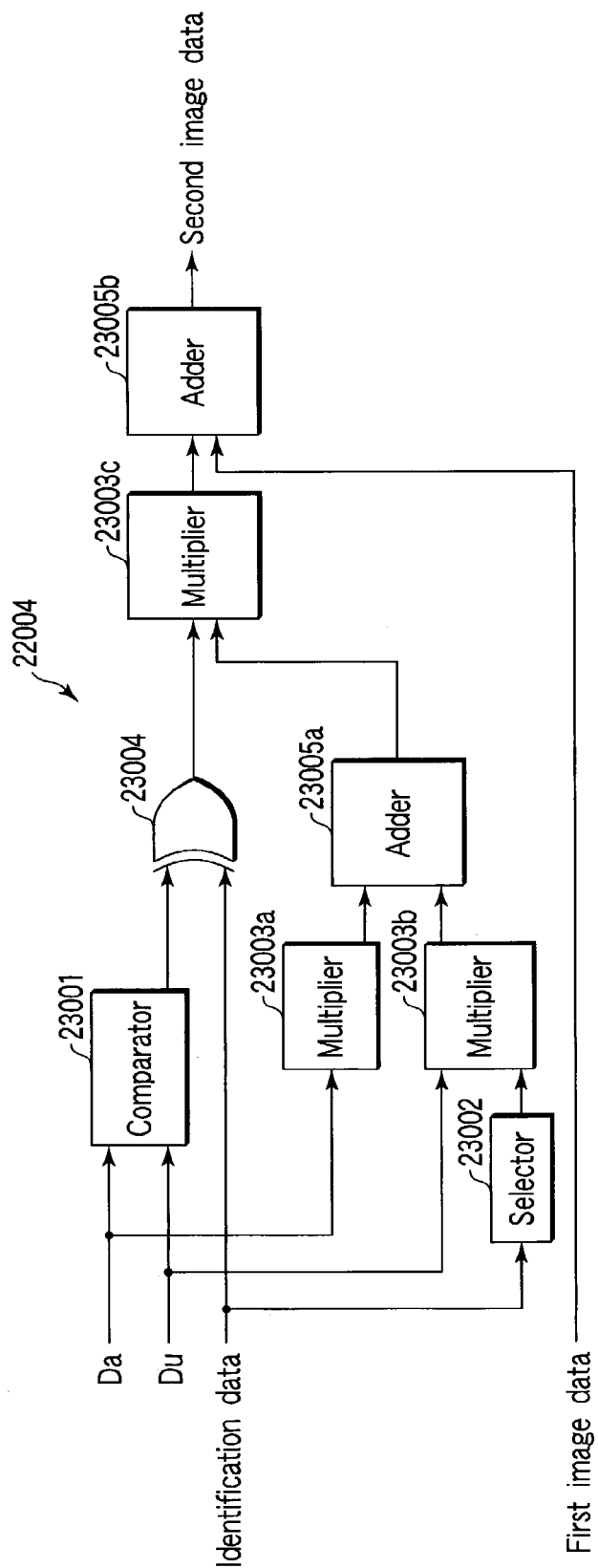
FIG. 22 is a block diagram showing the configuration of the trapping means of the fifth embodiment.
FIG. 23 is a block diagram showing the configuration of the image synthesizing section of the fifth embodiment.

FIG. 22 is a block diagram showing configuration of the trapping means 4002 of the fifth embodiment. The trapping means 4002 of the fifth embodiment includes line buffers 22001a, 22001b, a gradated region density average value computing section 22002, a uniform region density extracting section 22003 and an image synthesizing section 22004.

Since the line buffers 22001a, 22001b, the gradated region density average value computing section 22002 and the uniform region density extracting section 22003 are identical respectively with the line buffers 5001a, 5001b, the gradated region density average value computing section 5002 and the uniform region density extracting section 5003 of the first embodiment, they will not be described here any further.

FIG. 23 is a block diagram showing configuration of the image synthesizing section 22004 of the fifth embodiment. The image synthesizing section 22004 includes a comparator 23001, a selector 23002, multipliers 23003a, 23003b, 23003c, an EXOR circuit 23004 and adders 23005a, 23005b.

The fifth embodiment differs from the first embodiment in that, while the first embodiment uses a NOT circuit 8002, the fifth embodiment uses a selector 23002.

If a uniform region is a character, it is important for the character to preserve the contour profile and the density edges of the contour. If the region is expanded recklessly, the contour profile can be changed. Additionally, the contour edges can become blurred when the expanded region is subjected to an image processing operation similar to the processing operation performed for a photograph by an image processing means arranged downstream relative to the trapping means.

In view of this problem, the selector 23002 performs a selecting operation as illustrated in FIG. 24. It performs a processing operation similar to that of the NOT circuit and outputs data, in which the gradated region is represented by "1" and the uniform region is represented by "0", if the attribute of the pixels in the uniform region is that of a drawn image, but outputs data, in which both the gradated region and the uniform region are represented by "0", if the attribute is that of a character.

The selecting operation of the selector 23002 is performed by a CPU (not shown).

As a result, if the uniform region is a drawn image, a second image data obtained by performing a trapping processing operation similar to that of the first embodiment is output.

If the uniform region is a character, second image data containing data on the density value the same as that of the first image data is output when Da>Du, whereas second image data containing data on the density value of the gradated region the same as that of the first image data and data on the density value of the uniform region that is equal to the sum of Da and Du is output when Da<Du.

Figure 25:
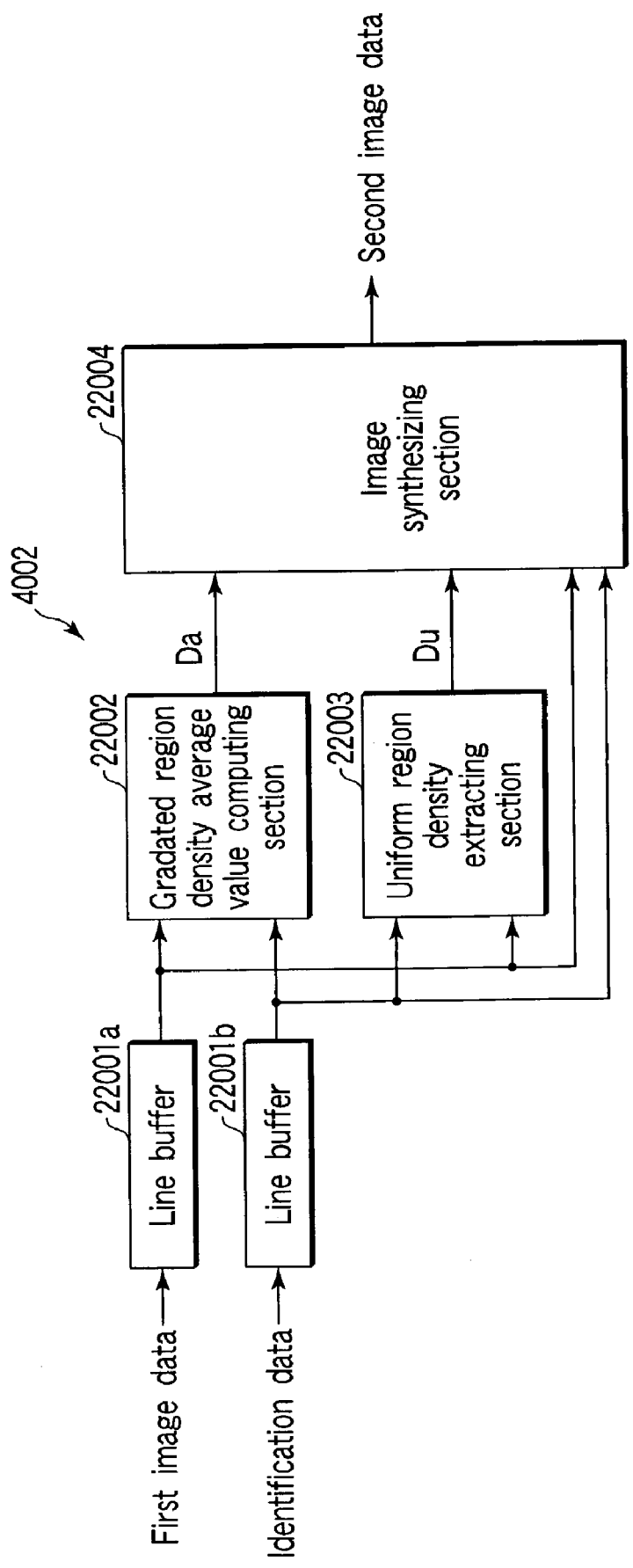
FIG. 25 is an illustration showing the operation of the image synthesizing section of the fifth embodiment.

FIG. 25 is an illustration showing the operation of the image synthesizing section 22004 of the fifth embodiment performed on the first image data based on the density average value Da of the gradated region, the density threshold value Td, and the identification data.

If the uniform region is a drawn image region, a trapping processing operation similar to that of the first embodiment is performed to output second image data.

If the uniform region is a character, the character region is not expanded regardless of its density value. In other words, if the density average value Da of the gradated region is greater than the density value Du of the uniform region (if it is judged that the gradated region is darker than the uniform region), the uniform region is not expanded and second image data that is similar to the first image data is output.

If, conversely, the density average value Da of the gradated region is smaller than the density value Du of the uniform region (if it is judged that the gradated region is lighter than the uniform region), the gradated region is expanded. In this case, second data that shows a density value the same as that of the first data for the gradated region and a density value equal to the sum of the density value Du of the uniform region and the density average value Da of the gradated region for the uniform region is output.

As described above, the fifth embodiment can adapt itself to misregistration that takes place in any direction as a result of a trapping processing operation performed with reference to a broad reference region.

Additionally, a processing operation that is suitable for each region can be performed by considering the attribute of the region based on the identification signal.

As described above, any of the above described embodiments can adapt itself to multidirectional misregistration of color form plates because the trapping processing operation is performed with reference to a broad region.

Furthermore, it can prevent both a shining blank area due to misregistration and overlapped colors due to misregistration from taking place.

Finally, it can perform a trapping processing operation that can vary depending on the attribute of each region.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus, comprising:
   image developing means for generating first image data for a plurality of color form plates and identification data representing attributes of their pixels;
   trapping means for performing a trapping processing operation with reference to the first image data and the identification data supplied from the image developing means and outputting second image data;
   image processing means for performing an image processing operation based on the second image data output from the trapping means and the identification data supplied from the image developing means; and
   image outputting means for outputting image data processed by the image processing means.

2. An apparatus according to claim 1, wherein
   the trapping means has a first line buffer which accumulates the first image data supplied from the image developing means for a predetermined number of lines to make block data in order to supply the first image data of a predetermined region and a second line buffer which accumulates the identification data supplied from the image developing means for the predetermined number of lines to make block data in order to supply the identification data of the predetermined region.

3. An apparatus according to claim 1, wherein
   the trapping means has a computing section which computes a density average value of a gradated region with reference to a predetermined region of the first image data and that of its identification data supplied from the image developing means, an extracting section which extracts a density of a uniform region with reference to the predetermined region of the first image data and that of its identification data supplied from the image developing means and an image synthesizing section which outputs second image data based on the density average value of the gradated region computed by the computing section, the density of the uniform region extracted by the extracting section and the first image data and its identification data supplied from the image developing means.

4. An apparatus according to claim 1, wherein
   the trapping means has an average value computing section which computes a density average value of a gradated region with reference to a predetermined region of the first image data and that of its identification data supplied from the image developing means, a maximum value computing section which computes a density maximum value of the gradated region with reference to the predetermined region of the first image data and that of its identification data supplied from the image developing means, a minimum value computing section which computes a density minimum value of the gradated region with reference to the predetermined region of the first image data and that of its identification data supplied from the image developing means, an extracting section which extracts a density of a uniform region with reference to the predetermined region of the first image data and that of its identification data supplied from the image developing means and an image synthesizing section which outputs second image data based on the density average value of the gradated region computed by the average value computing section, the density maximum value of the gradated region computed by the maximum value computing section, the density minimum value of the gradated region computed by the minimum value computing section, the density of the uniform region extracted by the extracting section and the first image data and its identification data supplied from the image developing means.

5. An image processing apparatus for receiving as input first image data for a plurality of color form plates and identification data representing attributes of their pixels as generated by image developing means and performs an image processing operation, the apparatus comprising:
   a density value computing section which computes density values of a gradated region with reference to a predetermined region of the first image data and its identification data supplied from the image developing means;
   an extracting section which extracts a density of a uniform region with reference to the predetermined region of the first image data and its identification data supplied from the image developing means;
   an image synthesizing section which outputs second image data based on the density values computed by the density value computing section, the density of the uniform region extracted by the extracting section and the first image data and its identification data supplied from the image developing means; and
   an image processing section which performs an image processing operation based on the second image data output from the image synthesizing section and the identification data supplied from the image developing means, wherein
   the density value computing section computes a density average value of the gradated region with reference to the predetermined region of the first image data and that of its identification data supplied from the image developing means; and
   the image synthesizing section outputs second image data based on the density average value of the gradated region computed by the density value computing section, the density of the uniform region extracted by the extracting section and the first image data and its identification data supplied from the image developing means.

6. An apparatus according to claim 5, wherein
   the density value computing section has a first line buffer which accumulates the first image data supplied from the image developing means for a predetermined number of lines to make block data and supplies the predetermined region of the first image data.

7. An apparatus according to claim 5 has a second line buffer which accumulates the identification data supplied from the image developing means for a predetermined number of lines to make block data and supplies the predetermined region of the identification data.

8. An apparatus according to claim 5, wherein
   the image synthesizing section outputs second image data in which the density value of the gradated region is equal to the sum of the density value of the gradated region and the density value of the uniform region and the density value of the uniform region is the same as the density value of the uniform region when the density average value of the gradated region is greater than the density value of the uniform region.

9. An apparatus according to claim 5, wherein
the image synthesizing section outputs second image data in which the density value of the gradated region is the same as the density value of the first image data and the density value of the uniform region is the sum of the density value of the uniform region and the density average value of the gradated region when the density average value of the gradated region is smaller than the density value of the uniform region.

10. An apparatus according to claim 5, wherein
the image synthesizing section outputs second image data in which the density values of all the pixels of the uniform region is equal to zero and the density value of the gradated region is the same as the density value of the first image data when a predetermined density threshold value is greater than the density average value of the gradated region and also greater than the density value of the uniform region and the density average value of the gradated region is greater than the density value of the uniform region.

11. An apparatus according to claim 5, wherein
the image synthesizing section outputs second image data in which the density values of all the pixels of the gradated region is equal to zero and the density value of the uniform region is the same as the density value of the first image data when a predetermined density threshold value is greater than the density average value of the gradated region and also greater than the density value of the uniform region and the density average value of the gradated region is smaller than the density value of the uniform region.

12. An apparatus according to claim 5, wherein
the density value computing section computes a density average value of the gradated region, a density maximum value of the gradated region and a density minimum value of the gradated region with reference to the predetermined region of the first image data and that of its identification data supplied from the image developing means; and
the image synthesizing section outputs second image data based on the density average value of the gradated region computed by an average value computing section, the density maximum value of the gradated region computed by a maximum value computing section and the density minimum value of the gradated region computed by a minimum value computing section, the density of the uniform region extracted by the extracting section and the first image data and its identification data supplied from the image developing means.

13. An apparatus according to claim 12, wherein
the image synthesizing section outputs second image data in which the density value of the gradated region is equal to the sum of the density value of the gradated region and the density value of the uniform region and the density value of the uniform region is the same as the density value of the uniform region when the density minimum value of the gradated region is greater than the density value of the uniform region.

14. An apparatus according to claim 12, wherein
the image synthesizing section outputs second image data in which the density value of the gradated region is the same as the density value of the gradated region and the density value of the uniform region is the sum of the density value of the uniform region and the density average value of the gradated region when the density maximum value of the gradated region is smaller than the density value of the uniform region.

15. An apparatus according to claim 12, wherein
the image synthesizing section outputs second image data in which the density values of the uniform region is equal to zero and the density value of the gradated region is the same as the density value of the first image data when a predetermined density threshold value is greater than the density maximum value of the gradated region and also greater than the density value of the uniform region and the density minimum value of the gradated region is greater than the density value of the uniform region.

16. An apparatus according to claim 12, wherein
the image synthesizing section outputs second image data in which the density values of the gradated region is equal to zero and the density value of the uniform region is the same as the density value of the first image data when a predetermined density threshold value is greater than the density maximum value of the gradated region and also greater than the density value of the uniform region and the density minimum value of the gradated region is smaller than the density value of the uniform region.

17. An image processing method of receiving as input first image data for a plurality of color form plates generated by image developing means and identification data representing attributes of their pixels, the method comprising:
computing density values of a gradated region with reference to a predetermined region of the first image data and its identification data supplied from the image developing means;
extracting a density of a uniform region with reference to the predetermined region of the first image data and its identification data supplied from the image developing means;
outputting second image data based on the computed density values, the extracted density of the uniform region and the first image data and its identification data supplied from the image developing means; and
performing an image processing operation based on the output second image data and the identification data supplied from the image developing means.

* * * * *